Nov. 4, 1941.   O. C. MARTIN   2,261,442
LIGHT TRANSMITTING SCREEN
Filed May 14, 1940   2 Sheets-Sheet 1
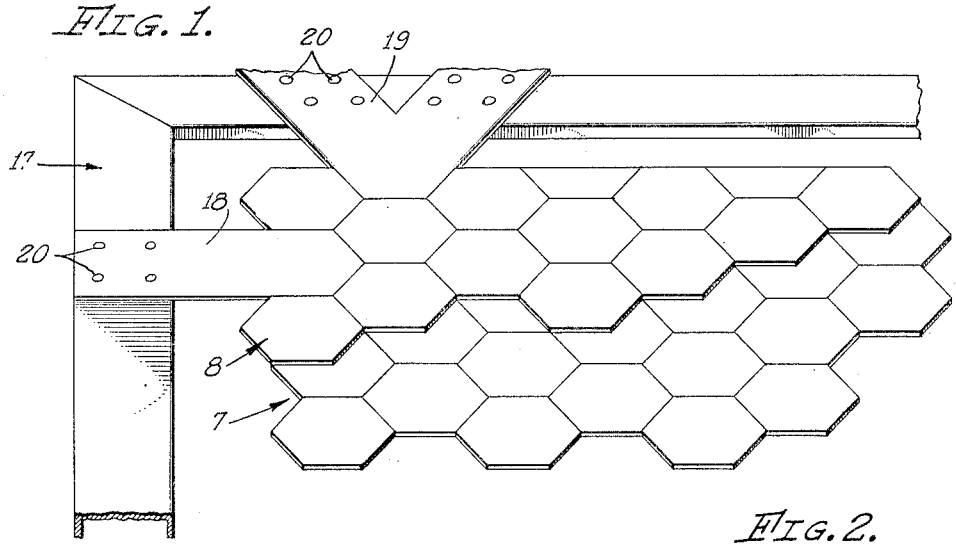
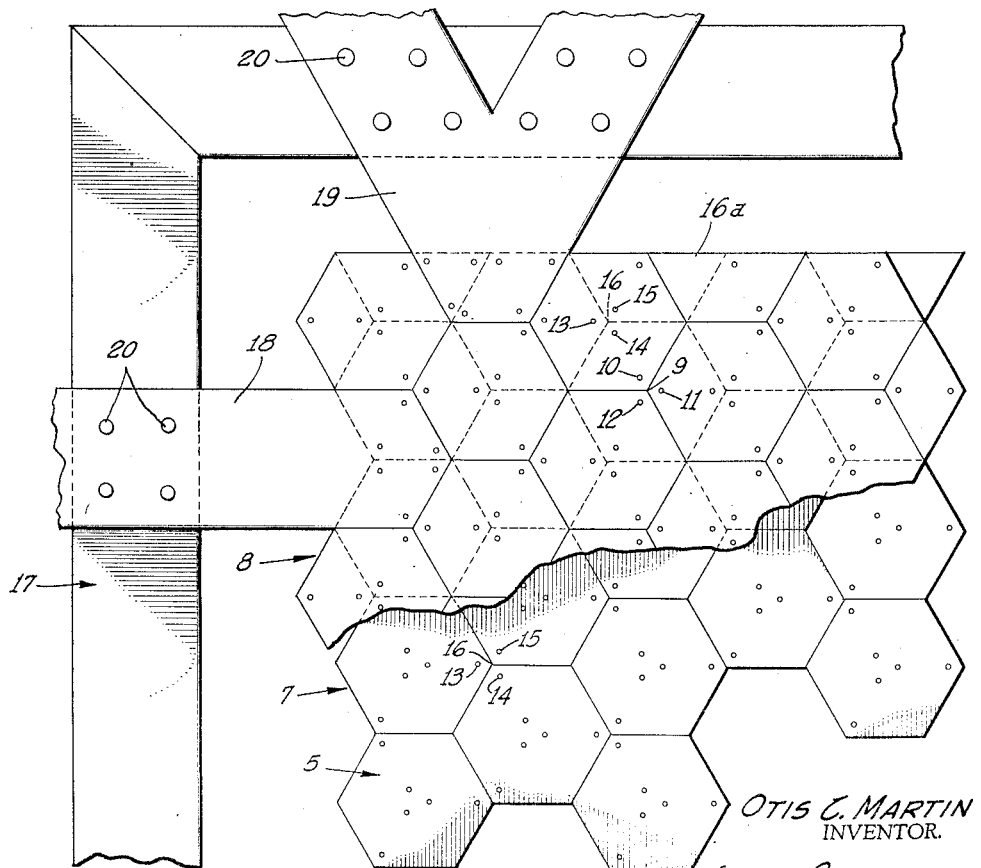
OTIS C. MARTIN
INVENTOR.
BY
ATTORNEY.

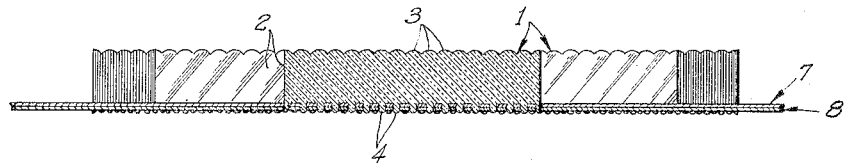
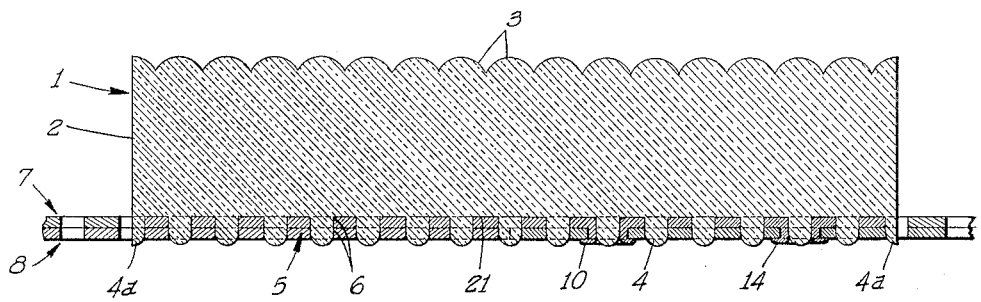
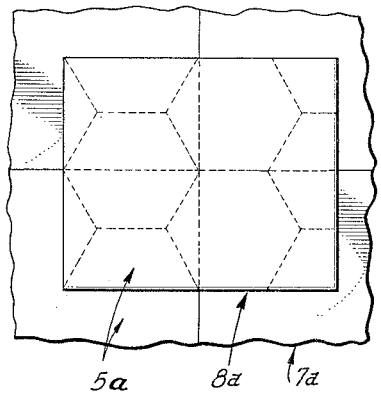
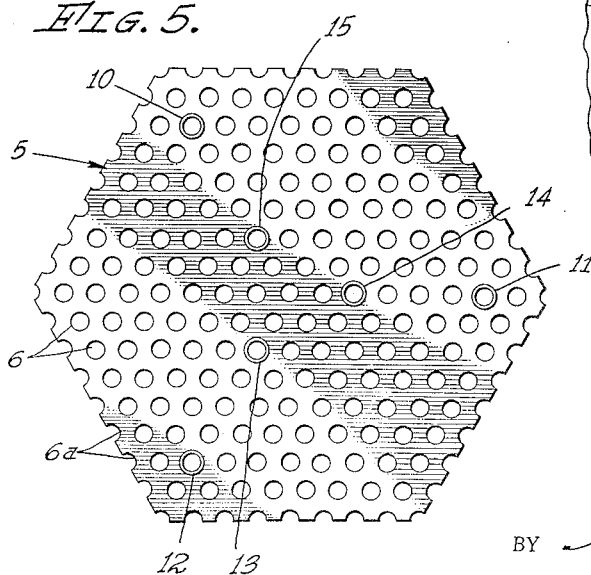

Patented Nov. 4, 1941

2,261,442

UNITED STATES PATENT OFFICE 2,261,442

LIGHT TRANSMITTING SCREEN

Otis C. Martin, Los Angeles, Calif.

Application May 14, 1940, Serial No. 335,087

6 Claims. (Cl. 88—24)

My invention relates to projection screens and has particular reference to a light transmitting screen, finding particular utility when employed for rephotographing motion pictures.

One of the most common uses of light transmitting screens for rephotography of motion pictures is in connection with the process known to the motion picture industry as "back projection." Back projection consists in projecting a motion picture of a landscape, street scene, or other background material upon a translucent projection screen. Actors participating in the enactment of a motion picture being filmed are positioned before this screen and the actors and the screen are photographed simultaneously so that the completed photograph portrays the actors in the environment which is "back projected" on the translucent screen.

Considerable difficulty has been encountered in the use of this process as regards the obtaining of the required uniformity of illumination throughout the entire surface of the translucent screen when viewed from the location of the camera lens. The use of a cloth screen for this process is unsatisfactory in that the cloth absorbs too much light and prevents adequate exposure of the film used in the rephotographing camera. As a result, ground glass has been used in the past but has not been satisfactory due to the fact that the ground glass, while tending to diffuse the light transmitted through it, tends nevertheless to transmit the greater proportion of the light in the same general direction as was followed by the light striking the screen. The screen therefore when viewed from the location of the camera lens displayed a very bright central area, becoming increasingly darker as the edge of the screen was approached.

The use of certain screen units made of "Lucite" (a transparent plastic material having a high efficiency of light transmission and a relatively high index refraction) has been eminently satisfactory as regards the construction of extremely small screens, namely, up to 1½ or 2 feet on the side. The Lucite screen units are die stamped or hot molded to very precise dimensions in an hexagonal shape and are provided on their front face with uniformly spaced protuberances which form individual lens units. Corresponding elements are provided on the back side in alignment with the lens elements on the front side and cooperate therewith to project light from the front protuberances with practically uniform distribution over an angle substantially equal to the angular scope of motion picture camera lenses.

It is apparent that properly aligned these blocks might be assembled into a screen of any desired size and when viewed from the location of the camera lens would provide uniform transmission of light to the camera lens. These extremely desirable properties of the Lucite screen units has resulted in many attempts to use these units in the fabrication of large sized projection screens. Until the present invention, however, no one has succeeded in assembling a multiplicity of these screen units into a screen of any substantial size due to the fact that no one has provided a means for holding the individual units in the proper location relative to each other and for maintaining the lens elements included in the screen units in the proper aligned position. In previous attempts one or more of these units was found to be sufficiently out of line as to cause a dark spot to appear in that location on the screen.

It is accordingly an object of my invention to provide a screen construction permitting the construction of a screen of any desired size employing Lucite screen units which will provide uniform illumination throughout the entire expanse of the screen when viewed from the location of a camera lens used to photograph the screen.

It is also an object of my invention to provide a structural support for carrying a plurality of Lucite screen units to provide a light transmitting screen of any desired size.

It is a further object of my invention to provide a light transmitting screen of the character set forth in the preceding paragraphs, employing a structural support for aligning and spacing individual Lucite screen units and supporting these units in such position as to provide a screen of any desired size capable of transmitting light uniformly to a camera used to photograph the screen.

It is a further object of my invention to form a light transmitting screen of the character set forth in the preceding paragraphs by providing a highly tensioned metal sheet for supporting the Lucite screen units.

It is another object of my invention to provide a metallic supporting sheet for a light transmitting screen of the character set forth in the preceding paragraphs, employing a plurality of interlocked metallic supporting elements, each of which is adapted to be die stamped with a high degree of accuracy as regards size and location of orifices for receiving the lens elements of the Lucite screen units.

It is also an object of my invention to provide an interlocked metallic screen supporting structure of the character set forth in the preceding paragraphs, with means for securing each of the supporting elements to a plurality of adjacent supporting elements to provide a substantially continuous metallic sheet for supporting the Lucite screen units.

Other objects and advantages of my invention will be apparent from a study of the following specifications, read in connection with the accompanying drawings, wherein Fig. 1 is a fragmentary oblique view illustrating the relationship between interlocked structural elements employed in the preferred embodiment of my invention;

Fig. 2 is a fragmentary view similar to Fig. 1 illustrating the relative locations of hexagonal structural elements and their manner of interconnection and attachment to a screen frame;

Fig. 3 is a fragmentary sectional view illustrating the relative locations of the structural elements and the Lucite screen units employed;

Fig. 4 is a greatly enlarged fragmentary view similar to Fig. 3 illustrating the manner in which the Lucite screen units are coordinated with the structural elements and the manner in which the individual structural elements are interlocked with each other;

Fig. 5 is a plan view depicting one of the structural elements employed in the preferred embodiment of my invention; and Fig. 6 is a fragmentary view similar to Fig. 2 illustrating the appearance of the screen supporting structure when constructed in accordance with an alternative form of my invention.

The Lucite screen units referred to hereinbefore are well known in the motion picture art and generally are constructed with an hexagonal outline and provided with a rear light collecting surface and a front light projecting surface, a typical form of construction being illustrated in Fig. 4 which represents a transverse section through one of these units. Each of the screen units 1 includes a transparent body portion 2 having formed on its rear surface a plurality of light collecting elements 3 which usually take the form of a segment of a sphere. The light collecting elements 3 are normally positioned on the side facing the motion picture projector and operate to collect the light projected from such projector and transmitted through the body portion 2.

The front surface of the screen unit 1 is accordingly provided with a plurality of light projecting elements 4, each of which is associated with and aligned with a corresponding one of the light collecting elements 3. The light projecting elements 4 are usually cylindrical in shape and terminate at their forward surface with a semi-spherical end. Each of the light projecting elements 4 cooperates with its associated light collecting element 3 to receive the light transmitted thereby through the body portion 2 and projected in the direction of a camera lens so as to cause the transmission from the motion picture projector to a motion picture camera of the light which is projected by the projector.

In order that each of the light transmitting elements 4 will appear to comprise an individual light source, each of which has the same apparent brightness when the unit is uniformly lighted from the rear surface, the cone of light projected by each of the light projecting elements 4 is arranged to have an angle substantially equal to the angular scope of a motion picture camera lens and arranged to uniformly distribute the light throughout this cone. Since the light projected by each of the light projecting elements 4 is uniformly distributed over its cone of projection, it will be apparent that each of the units will have the same apparent brightness irrespective of its position relative to a camera lens so long as it is disposed within the angular scope of such lens.

The appearance of uniform illumination is further enhanced by providing uniform spacing of the light projecting elements 4 relative to each other. These elements are usually arranged in an hexagonal configuration relative to each other in such fashion that half units 4a are disposed in spaced relationship relative to each other along each of the six edges of the hexagon. The use of the half elements 4a permits the abutting of another similar unit against the first one to provide a larger screen surface while maintaining the desired uniformity of spacing of the light projecting elements 4.

In order to support a plurality of Lucite screen units 1 in the proper aligned positions relative to each other to form a light transmitting screen, I provide a screen supporting structure which is formed of a multiplicity of structural elements 5, each of which is, in the preferred embodiment of my invention, constructed along the lines illustrated in Fig. 5. Each of the elements 5 is preferably stamped from relatively thin metal having a thickness substantially equal to one-half the distance each of the light projecting elements 4 protrudes beyond the front surface of the body portion 2 of the Lucite screen unit. Each of the elements 5 is preferably stamped in an hexagonal shape of precisely the same size as each of the screen units 1 and is provided with a plurality of orifices 6, each of which is of the precise size required to receive one of the light projecting elements 4 of the Lucite screen unit 1. The plurality of orifices 6 are disposed in the structural element 5 in the same spaced relationship relative to each other and relative to the configuration of the element 5 as are the light projecting elements 4 relative to the Lucite screen unit 1.

In a similar fashion each of the structural elements 5 is provided along each of its six edges with a plurality of spaced notches 6a corresponding to the half elements 4a disposed along the edges of each of the Lucite screen units 1. This construction permits one of the Lucite screen units 1 to be placed upon one of the structural elements 5 with each of the light projecting elements 4 being received in one of the openings 6 and each of the half elements 4a being received in its corresponding notch 6a.

In order to provide a precisely plane screen structure for in this fashion supporting a multiplicity of the screen units 1, I arrange the structural elements 5 in superimposed layers and interlock the front and rear layers to each other by placing the elements forming the front layer in staggered relationship relative to the positions of the elements forming the rear layer. This construction is clearly illustrated in Figs. 1 and 2 in which a rear layer 7 is illustrated as being formed of a plurality of hexagonal screen elements 5 nested together in such fashion that the adjacent surfaces of one of the elements 5 lies in abutting relation with a corresponding surface of six adjacent elements 5. A front layer 8 is formed in precisely the same fashion and disposed before the rear layer in such location that a junction 9 between three of the screen elements 5 disposed in the front layer will lie over the precise center of one of the screen elements 5 disposed in the rear layer. By providing three fastening means 10, 11 and 12, one of each of which is disposed adjacent the corner of each of the hexagonal elements 5 meeting at the junction 9, each of these adjacent elements may be secured to the element located directly therebehind.

This fastening may be augmented by providing in the center of each of the front elements 5 three additional fastening means 13, 14 and 15 disposed in such position that each of these fastening means engages a corner of each of three elements 5 disposed in the rear layer and meeting at a common junction point 16. An inspection of Fig. 2 will reveal that this method of securing the elements of the front layer to the elements of the rear layer provides each of the elements with six attaching means securing each element to three other elements in the opposite layer. It is readily apparent that the number of such fastening means may be increased or reduced as desired but it has been found that the above described arrangement provides the maximum number of interlocking connections between the front and rear layers with a minimum number of fastenings.

In order that the fastening means, such as the fastening means 10, may be used in the fashion described without conflicting with the insertion of the light projecting elements into the orifices 6 in each of the screen elements 5, I increase the diameter of those ones of the holes 6 which are disposed in a position to receive one of the fastening means 10—15. The manner in which these enlarged holes are employed to receive the fastening means may be observed by having reference to Fig. 4. As clearly shown in this figure, I prefer to use for the fastening means 10—15 a tubular outwardly projecting portion which is formed integrally with the rear screen elements 5 and which is provided with an internal bore of the precise size required to accurately receive one of the light projecting elements 4. The tubular portion may be passed through the enlarged openings 6 in the front sheet 8 and then flared outwardly and riveted so as to secure the front and rear elements to each other while maintaining a bore therethrough of the correct size for receiving the corresponding light transmitting element 4. If desired, corresponding bores 6 in both the front and rear elements may be enlarged and separate tubular rivets used for fastening the elements together.

The screen supporting structure thus formed may, if desired, be provided with a straight line edge by employing fractional elements 16a adapted to fill in the space left between adjacent elements, such construction being illustrated at the upper edge of Figs. 1 and 2. Such construction, however, is not essential since the serrated edge provided by omitting the fractional elements 16a closely approaches a straight line edge since the serrations formed are relatively small as compared with the total size of the sheet.

After the layers 7 and 8 have been assembled and secured to each other, the screen supporting structure may be secured to a suitable screen frame 17 in a highly tensioned condition so that the screen structure will describe a precisely plane surface. In order to secure the screen supporting sheet to the screen frame 17 in this highly tensioned condition, I substitute for a number of the units 5 disposed on the edges of the front surface a supporting means comprising a strap member 18 which has its inward end formed in such configuration as to nest into the interlocked screen structure in the same manner as would one of the elements 5. The strap member 18 is secured to the screen structure by means of the previously described fastening means 10—15.

Similar supporting means 19 is also provided along the upper and lower edges of the screen, the means 19 being preferably formed in a V-shape so that the inwardly projected apex of the V may be constructed in such configuration as to take the place of one of the screen elements 5, which would normally be disposed in the front screen layer at the upper or lower edge. The V-shape means 19 may also be secured to the screen structure in the same fashion as would the corresponding screen element 5.

A tension force may then be applied between all of the supporting means 18—19 and the screen frame 17 to move each of the supporting means outwardly relative to the space enclosed by the frame member so as to tightly stretch the interlocked screen supporting structure. After sufficient tension has been applied to each of the supporting means to cause the screen supporting structure to describe a substantially plane surface, the supporting means may be secured to the screen frame 17 by means of suitable securing devices such as bolts or rivets 20.

After the screen supporting structure has been stretched in this fashion, the Lucite screen units may then be applied by passing the light projecting elements 4 thereof through the holes 6 and by nesting all of the screen units 1 together so as to form a substantially continuous sheet of these units. The frictional engagement of the light projecting elements 4 with the holes 6 through which they are passed may be depended upon for holding each of the screen units in place, but in order to insure against the displacement of any of these units from their proper location, I prefer to apply an adhesive between the front surface 21 of each of the screen units 1 and the rear surface of the rear layer 7.

It will be readily apparent that this method of supporting and aligning the plurality of Lucite screen units disposes each of these units in such position relative to each adjacent unit that the assembled screen lies substantially in a plane and all of the light projecting elements 4 are directed in precisely the same direction.

It will be further apparent to those skilled in the art that when a screen manufactured in this fashion is lighted from the rear side, as by a motion picture projector, the front side of the screen will appear to be uniformly illuminated when viewed from the location of a camera lens disposed before the screen in order to photograph the scene projected thereon by the motion picture projector.

While I have described as the preferred embodiment of my invention an interlocked screen supporting structure employing a multiplicity of hexagonal elements 5, it will be readily apparent to those skilled in this art that other shapes of the elements 5 may be employed. I prefer to employ the shape described since in order to form a screen structure of this type each of the individual elements must be die stamped or manufactured in a similar fashion so as to provide extreme accuracy as regards the dimensions of the element itself and the relative location of each of the holes 6 therethrough. It is accordingly apparent that to attempt to use a solid sheet of the size required for back projection screens (it is not uncommon to employ a screen 30 feet high by 40 feet wide), it would be impossible to economically provide the multiplicity of holes 6 therethrough with sufficient accuracy as regards relative spacing in order to insure that all of the light projecting elements 4 of the Lucite screen units 1 would be received by such openings and hold each of these units in the required alignment. For this reason I prefer to form each of the screen elements 5 of the hexagonal shape illustrated in Fig. 5 or of some similar relatively small configuration which can be manufactured with the extreme accuracy required. I have illustrated, for example, in Fig. 6 the manner in which a plurality of rectangular elements 5a might be assembled and nested together to form a rear screen surface 7a and how a similar group of screen elements 5a might be nested together and assembled to form a front layer 8a. As in the preferred embodiment of my invention, the front layer 8a is disposed in staggered relationship relative to the rear layer 7a so that a plurality of fastening means passed through one of the front elements 5a may engage at least four adjacent elements disposed in the rear layer.

It will be observed that by employing the hexagonal shape illustrated in Fig. 5 the dimensions of such shape may be made equal to the dimensions of the Lucite screen units 1 or may be made some whole multiple thereof and that by so doing each of the elements employed in both of the front and rear layers may be made identical and that proper positioning of these elements relative to each other permits the interlocked assembly described.

It has been found, however, that certain other shapes which might otherwise be employed to advantage in the interlocked construction require a different arrangement of holes on the elements forming the front surface as compared to the elements forming the rear surface. For the sake of economy, the particular shape of the screen element 5 chosen should be such that the same type of element may be used in either the front or rear screen surface.

From the foregoing it will be apparent that I have provided a screen supporting structure which may be used to support and align a multiplicity of Lucite screen units in such position relative to each other as to permit the fabrication of a large size light transmitting screen which when viewed from the location of a camera lens provides uniform light transmission from a light source disposed behind the screen to said camera lens.

While I have shown and described the preferred embodiment of my invention, I do not desire to be limited to any of the details of construction shown or described herein, except as defined in the appended claims.

I claim:

1. In a light transmitting screen structure for supporting a multiplicity of transparent screen units having a plurality of spaced protruding light projecting elements, the combination of: a screen frame enclosing a screen area; a plurality of rear supporting elements disposed in abutting relation to define a rear screen layer; a plurality of front supporting elements overlying said rear screen layer and disposed in staggered relation to said rear supporting elements and in abutting relation to each other to define a front screen layer; fastening means for securing each of said rear supporting elements to all of the overlying front supporting elements in contact therewith to secure said front and rear screen layers to each other and define a substantially plane supporting sheet; and a multiplicity of orifices through said sheet disposed in such spaced relationship as to receive said protruding light projecting elements.

2. In a light transmitting screen structure for supporting a multiplicity of transparent screen units having a plurality of spaced protruding light projecting elements, the combination of: a screen frame enclosing a screen area; a plurality of thin and flexible rear supporting elements disposed in abutting relation to define a thin and flexible rear screen layer; a plurality of thin and flexible front supporting elements overlying said rear layer and disposed in staggered relation to said rear supporting elements and in abutting relation to each other to define a thin and flexible front screen layer; fastening means for securing each of said rear supporting elements to all of the overlying front supporting elements in contact therewith to secure said front and rear screen layers to each other and define a thin and flexible supporting sheet disposed in said screen area; means coacting with said sheet and said frame for securing said sheet to said frame in a highly tensioned state to cause said sheet to define a substantially plane surface; and a multiplicity of orifices through said sheet disposed in such spaced relationship as to receive said protruding light projecting elements.

3. In a light transmitting screen structure for supporting a multiplicity of transparent screen units having a plurality of spaced protruding light projecting elements, the combination of: a screen frame enclosing the screen area; a plurality of thin and flexible rear supporting elements disposed in abutting relation to define a thin and flexible rear screen layer; a plurality of orifices through each of said rear supporting elements disposed in such spaced relation as to receive the protruding light projecting elements of at least one of said screen units; a plurality of thin and flexible front supporting elements having a plurality of orifices therethrough for receiving said light projecting elements, said front supporting elements overlying said rear screen layer and being disposed in abutting relation to each other and in staggered relation to said rear supporting elements with said orifices through said front and rear supporting elements aligned to define a thin and flexible front screen layer; fastening means for securing each of said rear supporting elements to all of the overlying front supporting elements in contact therewith to secure said front and rear screen layers to each other and define a thin and flexible supporting sheet disposed in said screen area; and means coacting with said sheet and said frame for securing said sheet to said frame in a highly tensioned state to cause said sheet to define a substantially plane surface.

4. In a light transmitting screen structure for supporting a multiplicity of transparent screen units having a plurality of spaced protruding light projecting elements, the combination of: a substantially plane supporting sheet comprising a pair of superimposed supporting layers, each of which includes a plurality of supporting elements disposed in abutting relation to each other, the supporting elements in one layer being disposed in staggered relation to the supporting elements in the other of said layers; aligned orifices through both of said layers disposed in such spaced relationship as to receive said protruding light projecting elements, a part of said orifices being enlarged; and a fastening means for securing the supporting elements in one layer to adjacent supporting elements in the other of said layers comprising a tubular member passed through said enlarged orifices and having means engaging opposite sides of said superimposed layers, said tubular member having a central bore for receiving one of said protruding light projecting elements.

5. In a light projecting screen for supporting a multiplicity of hexagonal transparent screen units having a plurality of spaced protruding light projecting elements, the combination of: a plurality of hexagonal rear supporting elements having the same area as said hexagonal screen units and disposed in abutting relation to define a rear screen layer; a plurality of hexagonal front supporting elements overlying said rear screen layer and disposed in staggered relation to said rear supporting elements with alternate corners coincident with the centers of said rear supporting elements and in abutting relation with each other to define a front screen layer; a fastening means for securing each of said rear supporting elements to all of the overlying front supporting elements in contact therewith to secure said front and rear screen layers to each other and define a substantially plane supporting sheet; and a multiplicity of orifices through said sheet disposed in such spaced relationship as to receive said protruding light projecting elements.

6. In a light projecting screen for supporting a multiplicity of hexagonal transparent screen units having a plurality of spaced protruding light projecting elements, the combination of: a screen frame enclosing a screen area; a plurality of thin and flexible hexagonal supporting elements having the same area as said hexagonal screen units and disposed in abutting relation to define a thin and flexible rear screen layer; a plurality of thin and flexible hexagonal front supporting elements overlying said rear screen layer and disposed in staggered relation to said rear supporting elements with alternate corners coincident with the centers of said rear supporting elements and in abutting relation with each other to define a thin and flexible front screen layer; fastening means for securing each of said rear supporting elements to all of the overlying front supporting elements in contact therewith to secure said front and rear screen layers to each other and define a thin and flexible supporting sheet disposed in said screen area; means coacting with said sheet and said frame for securing said sheet to said frame in a highly tensioned state to cause said sheet to define a substantially plane surface; and a multiplicity of orifices through said sheet disposed in such spaced relationship as to receive said protruding light projecting elements.

OTIS C. MARTIN.